Feb. 26, 1957 — K. E. SESSLER — 2,783,072
DOME OR COWLING LATCH
Filed May 26, 1955 — 2 Sheets-Sheet 1

KENNETH E. SESSLER
INVENTOR

BY Hubert Miller

Feb. 26, 1957  K. E. SESSLER  2,783,072
DOME OR COWLING LATCH

Filed May 26, 1955  2 Sheets-Sheet 2

KENNETH E. SESSLER
INVENTOR

BY *Hubert Miller*

United States Patent Office 2,783,072
Patented Feb. 26, 1957

2,783,072

DOME OR COWLING LATCH

Kenneth E. Sessler, Wichita, Kans., assignor to Boeing Airplane Company, Wichita, Kans., a corporation of Delaware Application May 26, 1955, Serial No. 511,239

16 Claims. (Cl. 292—256)

This invention pertains to latches and more particularly to a latch adapted for use with aircraft where a flush outer surface is to be maintained, which latch will draw together the parts being latched, or conversely, force them apart on being unlatched.

Although there are many types of latching devices, some of which have a flush outer surface, all of them have certain disadvantages for certain applications. As an example, in the attachment of the entrance dome or protective cover on a jet engine, the dome or cover must be pulled up tight against the adjacent structure to form as smooth a surface as possible. This is often accomplished by having the edges of the dome slip on a fairly close fitting inner ring or bulkhead. The close fit, however, may result in the necessity of the use of considerable force in pulling the dome up tight against the adjacent skin of the aircraft. Thus it is desirable that the latch reach out a distance to become engaged and pull together with some appreciable motion of one part relative to the other during latching.

Conversely, when the dome or cowling is to be removed, a considerable force may be required to separate the dome from its adjacent structure. Thus a positive outward motion between parts of the latch is also desirable. Further, with the flush operating handle, it is not easy for a mechanic to get hold of the handle to pull it outwardly. Instead, such motion of the handle should at least be initiated by means inherent within the latch.

My device accomplishes all these desiderata and in addition has the advantage of providing a warning to the mechanic when the latch is not properly set. This is accomplished by structure which is not complicated or heavy, but is adequately strong.

Figure 1:
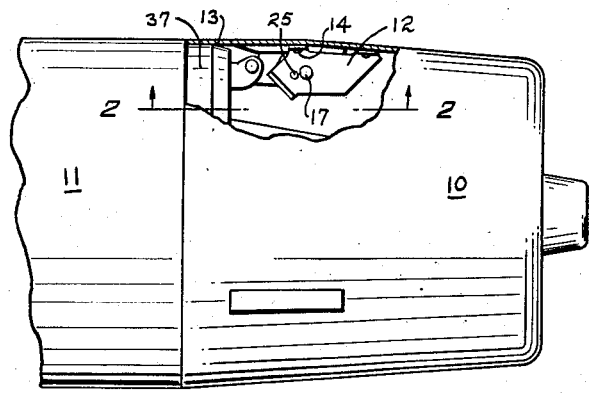
Figure 2:
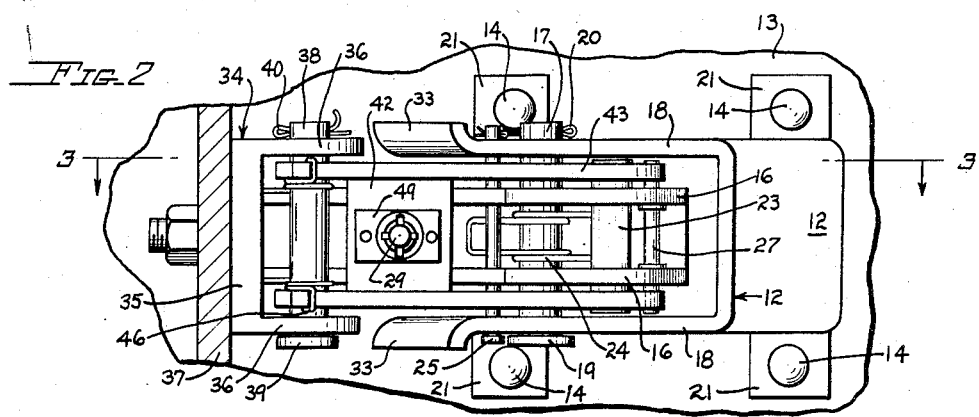
Figure 3:
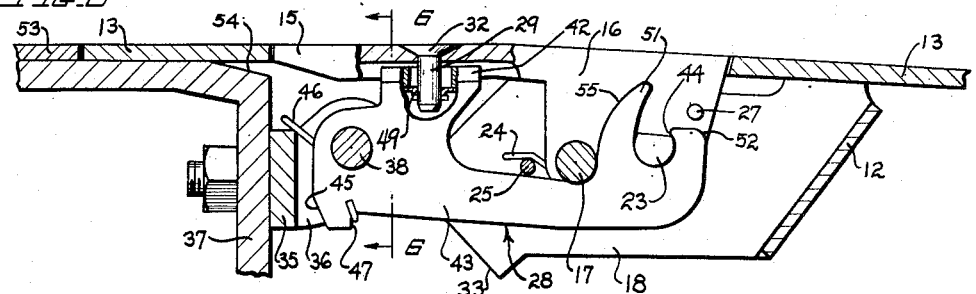
Figure 6:
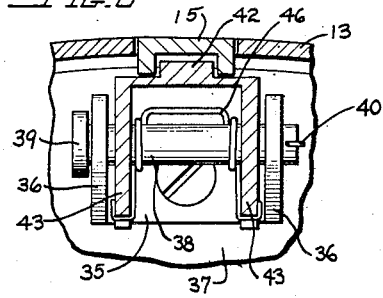
Figure 4:
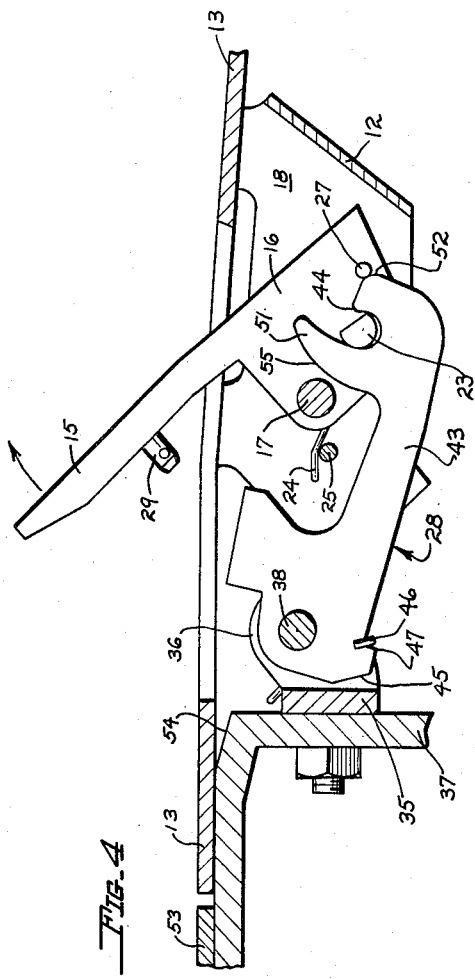
Figure 5:
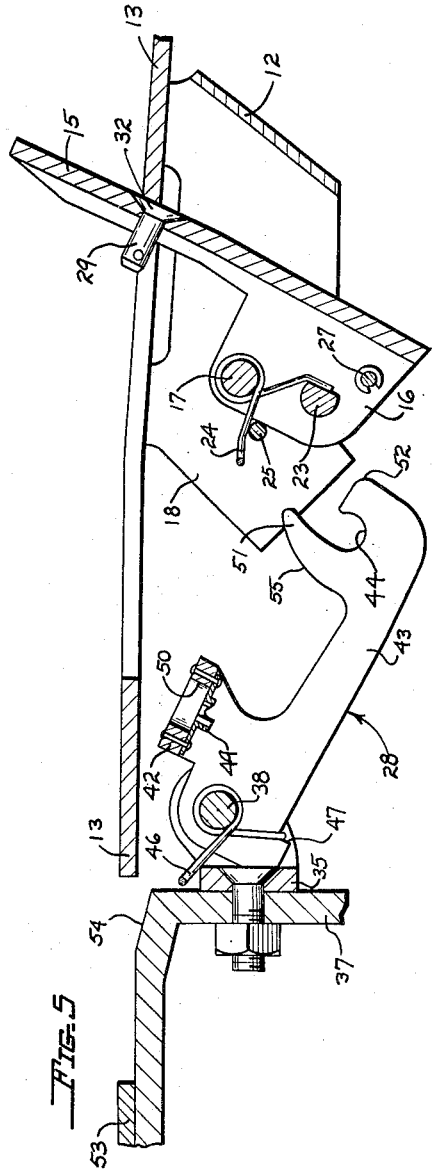

A further understanding of my invention may be gained by study of the following specifications and the figures in which:

Fig. 1 is a cutaway partial view of the nose of a jet engine nacelle showing my latch in place thereon, Fig. 2 is an enlarged bottom plan view of my latch from line 2—2 of Fig. 1, Fig. 3 is a sectional view along line 3—3 of Fig. 2 showing the latch in a latched position, Fig. 4 is a view similar to Fig. 3 showing the latch in a partially opened or intermediate position, Fig. 5 is a longitudinal medial sectional view showing the latch in a fully released position, and Fig. 6 is a sectional view along line 6—6 of Fig. 3.

Briefly my invention comprises a latch composed of two separable units, one of which includes a hook, and the other of which includes a bar which the hook engages. The bar is adapted to be engaged by the hook and then to be moved through a substantial distance in the latching procedure. The hook is formed so that the unlatching procedure causes the bar to push the hook in a direction opposite to the motion in latching. Also included in the bar carrying unit is a camming pin which, when the device is unlatched, engages a cam surface on the hook unit forcing the two units apart and assuring a positive unlatching. The operating handle of my device is biassed to an unlatched position and is held in the latched position by a positive fastener, thus providing a safety feature, since the handle will clearly show that it is not securely latched unless the fastener is properly connected.

More particularly and referring to the figures, my device is adapted for mounting on the cowling or outer dome 10 of a jet engine nacelle 11. The bar carrying unit comprises essentially two pieces, the first of which is an attaching bracket 12 which is of generally U-shape as best shown in Fig. 2. This bracket is attached to the skin 13 of the dome 10 by flush rivets 14 extending through ears 21 of the bracket 12, and provides support for the operating lever or handle 15. The handle 15 is formed with depending legs 16 pivotally journalled to the bracket 12 by a pin 17. This pin extends through the arms 18 of the bracket 12 and may be formed with a head 19 and held in place by a cotter key 20.

A latching bar 23 is carried in the legs 16 in a fixed position. The cross section of the bar 23 is of D-form, being a portion of a circle having a segment, and may be called a D-bar. This bar is easily formed by cutting a flat side on a cylindrical pin. The bar is pressed into the legs 16 or is otherwise permanently fixed therein so as to properly space the handle 15 and the legs 16 laterally within the bracket 12, as best shown in Fig. 2.

A spring 24, which may be conveniently coiled around the pin 17, is engaged between the bar 23 and a retaining pin 25 fixed in the bracket 12. The spring is stressed to bias the handle 15 to the unlatched position as shown in Fig. 5. In this position the pin 25 also serves as a stop by engaging the legs 16 to prevent motion any further than the position shown.

In addition to the latching bar 23, a cam pin 27 is carried by the legs 16. This pin is adapted to engage the hook part 28 of the latch to release it as will appear hereinafter. The stud 29 of a lock-stud type fastener, well known in the art, is also carried by the handle 15 in position to engage the mating nut 49 on the hook part 28 of the latch as will also be later described. This stud is formed with a flat head 32 which is received into a countersunk opening in the handle to preserve the flush outside lines.

The bracket 12 as noted, is of general U-shape having arms 18 embracing the handle part hereinbefore described. As there noted, the handle part is spaced from the arms 18, and is held in spaced relation thereto by the bar 23 which is slidable in an accurate path along the arms. The arms at their extremities 33 (Fig. 2) are curved outwardly to guide the hook part 28 into proper alignment so that the two legs 43 as hereinafter described will be in proper location to engage the bar 23.

The hook part 28 is carried by a mounting bracket 34 of generally channel shape having a web 35 and legs 36. The web 35 is adapted to be bolted or otherwise fixed to the forward end of the engine-mounting structure or bulkhead 37 of the nacelle 11. The hook part 28 is pivotally journalled between the legs 36 on a pin 38 extending through the legs 36 and being retained therein by a head 39 and a cotter pin 40. Thus the hook part has some freedom of motion pivotally about the pin 38.

The hook part 28 is also of channel shape having a small web 42 and depending legs 43 which extend outwardly to form two similar hooks, defined by the opening 44. At the end where it is journalled on the pin 38, the legs are formed with a stop surface 45 adapted to engage the web 35 of the bracket (Fig. 5) to limit the movement of the hooks 44 and to position them in proper position to be engaged by the bar 23. A spring 46 coiled around the pin 38 engages the web 35 and shoulders 47 on the legs 43 to bias the hooks 44 to their engaging position.

The web 42 carries the nut 49 of the stud fastener on its underside, in a manner well known in the art, so that the stud extends through a hole 50 in the web and engages the nut when my device is latched as shown in Fig. 3. Thus when the stud is fastened, the latch is permanently engaged, and when not fastened, the handle is urged to its upward position by the spring 24.

The formation of the hook ends of the legs 43 is of considerable importance to my invention also. This formation must be such that the bar 23 is positively held during both the latching and the unlatching of my device so that the relative motion of the bar 23 longitudinally of the latch, is transmitted to the hook legs 43. In the embodiment shown, the hooks are formed with an opening 44 of circular shape slotted out with a slot slightly less wide than the diameter of the circular hole so that the pin 23 will not slide out unless the flat side thereof is aligned with the walls of the slot. On the one side of the opening, the hook is formed with an upstanding finger 51 which acts to guide the pin 23 into the opening 44. The back of this finger has a surface 55 curved merely for the purpose of providing clearance for movement of the pin 17 past it as the device is unlatched. It will be noted, however, that in the latched position, the pin 17 engages the surface 55 to provide additional latching strength if it should be needed. The other side of the opening is lower but is formed with a rounded surface 52 against which the pin 27 pushes to unlatch the device as shown in Fig. 4.

The operation of my device can best be described in reference to Figs. 3, 4, and 5 which show, in sequence, the unlatching of my device. In Fig. 3 the device is shown firmly latched. In order to unlatch it, it is necessary to release the lock stud 29. This release may be accomplished by use of a screw driver or a wrench in a socket dependent on the type of head 32 used in the particular fastener. This is a device well known in the art, and details thereof are therefore not shown. As soon as the stud is released from its nut 49, the spring 24 causes the handle 15 to move outwardly to or through the position of Fig. 4.

During the motion from the position of Fig. 3 to that of Fig. 4, the bar 23 is turned in the hook opening 44, and the cam pin 27 engages the surface 52 on the hook. It will be noted that in my preferred embodiment, the first movement caused by the spring 24 carries the bar 23 in a direction nearly perpendicular to the finally desired movement which will be axially of the nacelle 11. Thus the force required for this initial movement will not be great. As the bar 23 moves further in its arc of movement, it presses against the hook finger 51 and forces relative movement between the latch parts axially of the nacelle. This movement causes the skin 13 of the dome 10 to slide outwardly away from the skin 53 of the nacelle. It will be obvious to those skilled in the art that as the handle 15 moves further outward from the position of Fig. 4, the axial movement will be accelerated and that it will be possible thus to disengage the nose dome 10 easily from the nacelle. Movement beyond the position of Fig. 4 may be caused by manual operation of the handle 15. The critical part of the movement is the initial stage in which the spring 24 causes the handle to move outwardly to a point where it may be grasped. This avoids the necessity of digging the handle out of its socket with a screw driver or the like with consequent damage to the skin.

Further outward movement of the handle, as noted above, will cause increased relative movement. In addition, the bar 23 is further rotated in the hook opening 44, and the pin 27 presses the surface 52 downward away from the bar 23 so that the latch is positively disengaged. The two latched parts are thus unlatched and free to be moved apart as shown in Fig. 5.

In latching my device, the procedure is simply reversed. The two parts to be latched are brought together. The finger 51 guides the bar 23 into proper position to be hooked; the curved ends 33 guide the hooks legs 43 into proper position; and a chamfered surface 54 on the bulkhead 37 guides the skin 13 into proper alignment with the skin 53 of the nacelle. Each of these guides make possible more simple operation of my latch.

As the bar 23 engages the finger 51, it will cause the handle 15 to be moved somewhat. This is a signal that the latch may then be pulled up by the handle. Pulling the handle 15 over and down causes the bar 23 to be engaged in the hook opening 44 and pulls the two parts together in an exact reversal of the unlatching operation until the skin 13 of the dome 10 is tight against the skin 53 of the nacelle 11. Finally, the positive engagement of the lock stud holds the latch in its closed position.

It will be apparent that my device not only provides a positive pulling together of the dome onto the nacelle, but also a positive pushing apart of the parts thereof. This action is caused by a spring and does not require prying up the handle by a screw driver nor openings or depressions beside the handle for hand hold. In addition, the automatic rising of the handle when the lock stud is not fastened is a danger signal to the mechanic that the latch is not properly fastened. This signal is clearly visible and does not require an elaborate check. Thus I have provided a safer and more convenient latch than has been known heretofore.

Having thus described my invention in one embodiment thereof, I am aware that numerous departures may be made therefrom without departing from the spirit and scope of the invention as limited only by the following claims.

I claim:

1. A latch for securing two parts together comprising: a one piece rigid member having an integral hook at one end; a transverse pin pivotally connecting the opposite end of said member to one part to be latched; a one piece rigid handle member; a transverse pin pivotally connecting the handle member at a point intermediate its ends to the other part to be latched; hook engaging means carried by the handle member at a point spaced from the handle pivot axis; spring means engaging and biasing the handle member to rotate in a direction to move the hook engaging means toward that side of the handle pivot axis adjacent the hook; means limiting the rotational movement of the handle member in the said direction to thus normally position the hook engaging means in a hook engaging and disengaging position, said hook engaging means being adapted, when the handle member is rotated in the opposite direction to positively engage the hook and by its travel about the handle member pivot axis to force the hook member and the part to which it is pivotally connected toward the part to which the handle member is pivotally connected.

2. The latch described in claim 1 and cooperating means on the hook member and on that portion of the handle member opposite the hook engaging means to hold the hook member and the handle member in their fully engaged positions.

3. A latch for positively drawing two mating parts into intimate relationship along a substantially linear path of travel, for holding said parts together in such relationship, and for subsequently forcing them away from each other along the same path of travel to separate them, said latch comprising: hook means pivotally connected to one of said parts; handle means pivotally connected at a point intermediate its ends to the other part, the pivot axes of both hook means and handle means normally lying in a common plane and parallel to each other and transverse to said linear path of travel; transversely disposed hook engaging means fixed on said handle means at a point spaced from the pivot axis thereof and adapted to initially engage and to disengage from said hook means when the handle is rotated to move the hook engaging means to a certain position immediately adjacent the hook means and on that side of the pivot axis of the handle means which is nearer the pivot axis of the hook means, whereby when the hook engaging means is in said certain position and is engaged with the hook means rotation of the handle means in one direction forces the part to which the hook means is connected toward the part to which the handle means is connected and after a predetermined degree of rotation of the handle means in said one direction the handle and hook means together serve to hold the two parts against movement in separating directions.

4. Means for forcing two parts toward each other and latching them against separative movement comprising: hook means pivotally connected to one of said parts; handle means pivotally connected to the other of said parts; hook engaging means fixed on the handle means at a location spaced from the pivot axis of the handle means; spring means engaging and urging the hook means to a predetermined position for engagement with and disengagement from the hook engaging means; and spring engaging and urging the handle means to a predetermined position which places the hook engaging means on that side of the handle means pivot axis nearest the hook means, in which location the hook engaging means is in a position to engage with and disengage from the hook means, whereupon when the hook engaging means and the hook means are engaged and the handle means is rotated in a direction to move the hook engaging means toward the opposite side of the handle means pivot axis the hook means travels bodily therewith and consequently forces the part to which the hook means is connected toward the part to which the handle means is connected, and after a predetermined degree of rotation of the handle means in said direction the handle means and hook means together serve to hold the two parts against movement in separating directions.

5. The mechanism described in claim 4, and cooperating means on the hook means and handle means for locking both in the respective positions in which they serve to hold the two parts against movement in separating directions.

6. Means for latching a first part to a second part comprising a hook means attached to one of said parts, handle means pivotally fixed to the other of said parts and movable between an engaged position and a disengaged position, bar means carried by said handle means spaced from the pivotal center of movement of said handle means, said bar means being normally engaged with said hook means, said hook means being formed to positively grip said bar means against any movement laterally thereof, said bar means being formed to be released of said grip upon rotation to said disengaged position of said handle whereby said bar means will cause relative movement between said handle means and said hook means while being moved between said engaged and disengaged positions.

7. Means for latching a relatively movable part to a fixed part comprising hook means adapted to be attached to said fixed part, said hook means having a hook end formed with an opening therein in the form of a slotted circle, the slot being of width somewhat smaller than the diameter of the circle, handle means pivotally connected to said movable part at a pivot center, bar means fixed to said handle means at a location spaced from said pivot center, said bar means having the form of a circular cylinder having a flat side, said bar means being thereby adapted to be normally held in said opening but releasable therefrom at a release position in which said flat side is in register with said slot.

8. Means for latching a relatively movable part to a fixed part comprising hook means adapted to be attached to said fixed part, said hook means having a hook end formed with an opening therein in the form of a slotted circle, the slot being of width somewhat smaller than the diameter of the circle, handle means pivotally connected to said movable part at a pivot center, bar means fixed to said handle means at a location spaced from said pivot center, said bar means having the form of a circular cylinder having a flat side, said bar means being thereby adapted to be normally held in said opening but releasable therefrom at a release position in which said flat side is in register with said slot, spring means engaging said handle means urging said handle means to said release position, and means engageable between said handle part and said hook part to resist the urging of said spring means.

9. The latch means of claim 8 in which the hook means is pivotally mounted to said fixed part and is pivotally movable between limits.

10. Means for latching a relatively movable part to a fixed part comprising hook means adapted to be attached to said fixed part, said hook means having a hook end formed with an opening therein in the form of a slotted circle, the slot being of width somewhat smaller than the diameter of the circle, handle means pivotally connected to said movable part at a pivot center, bar means fixed to said handle means at a location spaced from said pivot center, said bar means having the form of a circular cylinder having a flat side, said bar means being thereby adapted to be normally held in said opening but releasable therefrom at a release position in which said flat side is in register with said slot, finger means on said hook means, one surface of said finger means being a continuation of one wall of said slot whereby said bar means is guided into said slot.

11. Means for latching a relatively movable part to a fixed part comprising hook means adapted to be attached to said fixed part, said hook means having a hook end formed with an opening therein in the form of a slotted circle, the slot being of width somewhat smaller than the diameter of the circle, handle means pivotally connected to said movable part at a pivot center, bar means fixed to said handle means at a location spaced from said pivot center, said bar means having the form of a circular cylinder having a flat side, said bar means being thereby adapted to be normally held in said opening but releasable therefrom at a release position in which said flat side is in register with said slot, said hook means being formed to provide a cam surface thereon, cam pin means carried by said handle means, said pin means being located so as to engage said cam surface as said handle means moves to said release position to cause said bar means to be released from said opening.

12. Latch means adapted to fasten a movable part having an outer skin to a fixed part having a bulkhead over which said skin is adapted to slide comprising a mounting bracket having a web adapted to be fixed to said bulkhead, hook means pivotally mounted on said bracket, stop surfaces on said hook means adapted to engage said web to limit the movement of said hook means, spring means engaged between said bracket and said hook means urging said stop surfaces against said web thereby adapted to position said hook means in an engagement position, said hook means being formed to provide an opening therein, said opening being in the shape of a circle with a slot extending therefrom, said slot being of somewhat less width than the diameter of the circle, finger means on said hook means extending upward from the surface of said slot to form a guide into said slot, channel shaped bracket means adapted to be fixed to said outer skin, said bracket means having arms thereon curving outwardly at their extremities to provide guides for said hook means, said hook means being normally extended between said arms, handle means pivotally connected to said bracket means by means of a pivot pin, a D-bar fixed to said handle means and fitted into said opening in said hook means when said latch means is latched, said D-bar being adapted to be released from said opening by rotation thereof until its flat side is in register with the walls of said slot, said D-bar being spaced on said handle means radially from said pivot pin and substantially longitudinally of said latch means and being movable to a point substantially transversely of said latch means, said D-bar thereby being in positive engagement with said hook means while being moved arcuately about said pivot pin, from its engaged to its release position, the arcuate movement having a substantial component in a direction longitudinally of said latch means.

13. Latch means adapted to fasten a movable part having an outer skin to a fixed part having a bulkhead over which said skin is adapted to slide comprising a mounting bracket having a web adapted to be fixed to said bulkhead, hook means pivotally mounted on said bracket, stop surfaces on said hook means adapted to engage said web to limit the movement of said hook means, spring means engaged between said bracket and said hook means urging said stop surfaces against said web thereby adapted to position said hook means in an engagement position, said hook means being formed to provide an opening therein, said opening being in the shape of a circle with a slot extending therefrom, said slot being of somewhat less width than the diameter of the circle, finger means on said hook means extending upward from the surface of said slot to form a guide into said slot, channel shaped bracket means adapted to be fixed to said outer skin, said bracket means having arms thereon curving outwardly at their extremities to provide guides for said hook means, said hook means being normally extended between said arms, handle means pivotally connected to said bracket means by means of a pivot pin, a D-bar fixed to said handle means and fitted into said opening in said hook means when said latch means is latched, said D-bar being adapted to be released from said opening by rotation thereof until its flat side is in register with the walls of said slot, said D-bar being spaced on said handle means radially from said pivot pin and substantially longitudinally of said latch means and being movable to a point substantially transversely of said latch means, said D-bar thereby being in positive engagement with said hook means while being moved arcuately about said pivot pin from its engaged to its release position, the arcuate movement having a substantial component in a direction longitudinally of said latch means, said finger means on said hook means being formed to engage said pivot pin in the latched position to provide additional latched strength.

14. Latch means adapted to fasten a movable part having an outer skin to a fixed part having a bulkhead over which said skin is adapted to slide comprising a mounting bracket having a web adapted to be fixed to said bulkhead, hook means pivotally mounted on said bracket, stop surfaces on said hook means adapted to engage said web to limit the movement of said hook means, spring means engaged between said bracket and said hook means urging said stop surfaces against said web thereby adapted to position said hook means in an engagement position, said hook means being formed to provide an opening therein, said opening being in the shape of a circle with a slot extending therefrom, said slot being of somewhat less width than the diameter of the circle, finger means on said hook means extending upward from the surface of said slot to form a guide into said slot, channel shaped bracket means adapted to be fixed to said outer skin, said bracket means having arms thereon, said hook means being normally extended between said arms, handle means pivotally connected to said bracket means by means of a pivot pin, a D-bar fixed to said handle means and fitted into said opening in said hook means when said latch means is latched, said D-bar being adapted to be released from said opening by rotation thereof until its flat side is in register with the walls of said slot, said D-bar being spaced on said handle means radially from said pivot pin and substantially longitudinally of said latch means and being movable to a point substantially transversely of said latch means, said D-bar thereby being in positive engagement with said hook means while being moved arcuately about said pivot pin from its engaged to its release position, the arcuate movement having a substantial component in a direction longitudinally of said latch means, spring means engaging said handle means urging said handle means to its released position, and positive fastening means engageable between said handle means and said hook means to hold said handle means in its latched position.

15. Latch means adapted to fasten a movable part having an outer skin to a fixed part having a bulkhead over which said skin is adapted to slide comprising a mounting bracket having a web adapted to be fixed to said bulkhead, hook means pivotally mounted on said bracket, stop surfaces on said hook means adapted to engage said web to limit the movement of said hook means, spring means engaged between said bracket and said hook means urging said stop surfaces against said web thereby adapted to position said hook means in an engagement position, said hook means being formed to provide an opening therein, said opening being in the shape of a circle with a slot extending therefrom, said slot being of somewhat less width than the diameter of the circle, finger means on said hook means extending upward from the surface of said slot to form a guide into said slot, a cam surface on said hook means on the side of said slot opposite said finger means, channel shaped bracket means adapted to be fixed to said outer skin, said bracket means having arms thereon curving outwardly at their extremities to provide guides for said hook means, said hook means being normally extended between said arms, handle means pivotally connected to said bracket means by means of a pivot pin, a D-bar fixed to said handle means and fitted into said opening in said hook means when said latch means is latched, said D-bar being adapted to be released from said opening by rotation thereof until its flat side is in register with the walls of said slot, said D-bar being spaced on said handle means radially from said pivot pin and substantially longitudinally of said latch means and being movable to a point substantially transversely of said latch means, said D-bar thereby being in positive engagement with said hook means while being moved arcuately about said pivot pin from its engaged to its released position, the arcuate movement having a substantial component in a direction longitudinally of said latch means, a cam pin on said handle means adapted to come into camming engagement with said cam surface as said handle moves to its release position to positively disengage said D-bar from said slot.

16. Latch means adapted to fasten a movable part having an outer skin to a fixed part having a bulkhead over which said skin is adapted to slide comprising a mounting bracket having a web adapted to be fixed to said bulkhead, hook means pivotally mounted on said bracket, stop surfaces on said hook means adapted to engage said web to limit the movement of said hook means, spring means engaged between said bracket and said hook means urging said stop surfaces against said web thereby adapted to position said hook means in an engagement position, said hook means being formed to provide an opening therein, said opening being in the shape of a circle with a slot extending therefrom, said slot being of somewhat less width than the diameter of the circle, finger means on said hook means extending upward from the surface of said slot to form a guide into said slot, a cam surface on said hook means on the side of said slot opposite said finger means, channel shaped bracket means adapted to be fixed to said outer skin, said bracket means having arms thereon, said hook means being normally extended between said arms, handle means pivotally connected to said bracket means by means of a pivot pin, a D-bar fixed to said handle means and fitted into said opening in said hook means when said latch means is latched, said D-bar being adapted to be released from said opening by rotation thereof until its flat side is in register with the walls of said slot, said D-bar being spaced on said handle means radially from said pivot pin and substantially longitudinally of said latch means and being movable to a point substantially transversely of said latch means, said D-bar thereby being in positive engagement with said hook means while being moved arcuately about said pivot pin from its engaged to its release position, the arcuate movement having a substantial component in a direction longitudinally of said latch means, a cam pin on said handle means adapted to come into camming engagement with said cam surface as said handle moves to its release position to positively disengage said D-bar from said slot, spring means engaging said handle means urging said handle means to its released position, and positive fastening means engageable between said handle means and said hook means to hold said handle means in its latched position.

References Cited in the file of this patent
UNITED STATES PATENTS

| | | |
|---|---|---|
| 1,007,398 | Snider | Oct. 31, 1911 |
| 1,734,282 | White | Nov. 5, 1929 |
| 2,712,955 | Andrews | July 12, 1955 |